United States Patent
Floyd et al.

(10) Patent No.: US 8,438,839 B2
(45) Date of Patent: May 14, 2013

(54) EXHAUST GAS STREAM VORTEX BREAKER

(75) Inventors: Ryan A. Floyd, Mason, MI (US);
Joseph G. Ralph, Owosso, MI (US);
Christopher J. Kleinfeld, Olivet, MI
(US); James J. Reynolds, III, East
Lansing, MI (US); Larry J. Greer,
Jackson, MI (US); Manoj K. Sampath,
Ann Arbor, MI (US); **Michael L.
Shovels, Jackson, MI (US); Robert P.
M. Cloudt, Nederweert (NL); Rik S. G.
Baert, Oostmalle (BE); Johannes P. M.
Smeulers, Zwijndrecht (NL); Erik van
den Tillaart**, Echt (NL)

(73) Assignee: **Tenneco Automotive Operating
Company Inc.**, Lake Forest, IL (US)

( * ) Notice: Subject to any disclaimer, the term of this
patent is extended or adjusted under 35
U.S.C. 154(b) by 324 days.

(21) Appl. No.: 12/907,421

(22) Filed: Oct. 19, 2010

(65) Prior Publication Data
US 2012/0090305 A1    Apr. 19, 2012

(51) Int. Cl.
*F01N 3/00*    (2006.01)
(52) U.S. Cl.
USPC ............. 60/286; 60/295; 60/301; 60/303;
60/324; 239/129; 239/132.1; 239/132.3
(58) Field of Classification Search .................. 60/274,
60/286, 295, 297, 301, 303; 239/128, 129,
239/132.1, 132.3
See application file for complete search history.

(56) References Cited

U.S. PATENT DOCUMENTS

| 3,958,757 | A | 5/1976 | Happel et al. |
| 4,292,947 | A | 10/1981 | Tanasawa et al. |
| 4,742,964 | A | 5/1988 | Ito et al. |
| 4,805,837 | A | 2/1989 | Brooks et al. |
| 5,307,997 | A | 5/1994 | Wakeman |
| 5,522,218 | A | 6/1996 | Lane et al. |
| 5,570,841 | A | 11/1996 | Pace et al. |
| 5,605,042 | A | 2/1997 | Stutzenberger |
| 5,713,327 | A | 2/1998 | Tilton et al. |
| 5,924,280 | A | 7/1999 | Tarabulski |
| 5,976,475 | A | 11/1999 | Peter-Hoblyn et al. |
| 6,063,350 | A | 5/2000 | Tarabulski et al. |
| 6,470,676 | B2 | 10/2002 | Dolling et al. |
| 6,539,708 | B1 | 4/2003 | Hofmann et al. |
| 6,708,904 | B2 | 3/2004 | Itatsu |
| 6,742,330 | B2 | 6/2004 | Genderen |

(Continued)

FOREIGN PATENT DOCUMENTS

| DE | 2418227 | 10/1975 |
| DE | 10241697 | 4/2003 |

(Continued)

*Primary Examiner* — Binh Q Tran
(74) *Attorney, Agent, or Firm* — Harness, Dickey & Pierce, P.L.C.

(57) ABSTRACT

An exhaust gas treatment system for reducing emissions from an engine includes an exhaust conduit adapted to supply an exhaust stream from an engine to an exhaust treatment device. An injector injects a reagent through an aperture in the conduit into the exhaust stream. A vortex breaker includes a mount having a cylindrical sleeve extending through the aperture as well as a flared tube fixed to and positioned within the cylindrical sleeve. A window extends through an upstream portion of the cylindrical sleeve exposing the flared tube to the exhaust stream. The sleeve includes a downstream aperture in fluid communication with the window.

18 Claims, 5 Drawing Sheets

U.S. PATENT DOCUMENTS

| | | |
|---|---|---|
| 7,100,366 B2 | 9/2006 | Hager et al. |
| 7,152,396 B2 * | 12/2006 | Cheng .............................. 60/286 |
| 7,509,799 B2 * | 3/2009 | Amou et al. ..................... 60/286 |
| 8,006,487 B2 * | 8/2011 | Gaiser ............................. 60/303 |
| 8,033,101 B2 * | 10/2011 | Amon et al. ..................... 60/286 |
| 8,114,364 B2 * | 2/2012 | Harinath et al. ............... 422/654 |
| 8,196,388 B2 * | 6/2012 | Park et al. ....................... 60/282 |
| 8,240,137 B2 * | 8/2012 | Liu et al. ......................... 60/295 |
| 2002/0001554 A1 | 1/2002 | Czarnik et al. |
| 2003/0226412 A1 | 12/2003 | Rumminger et al. |
| 2006/0070374 A1 | 4/2006 | Gaiser et al. |
| 2009/0179087 A1 | 7/2009 | Martin et al. |
| 2010/0212292 A1 * | 8/2010 | Rusch et al. .................... 60/274 |

FOREIGN PATENT DOCUMENTS

| | | |
|---|---|---|
| EP | 1111231 | 6/2001 |
| JP | 11-166410 | 6/1999 |
| JP | 2003-328735 | 11/2003 |
| WO | WO2007/110575 | 10/2007 |
| WO | WO2008/080695 | 7/2008 |

* cited by examiner

EXHAUST GAS STREAM VORTEX BREAKER

FIELD

The present disclosure relates to injector systems and, more particularly, relates to an injector system for injecting a reagent into an exhaust stream from an engine.

BACKGROUND

This section provides background information related to the present disclosure which is not necessarily prior art.

Lean burn engines provide improved fuel efficiency by operating with an excess of oxygen over the amount necessary for complete combustion of the fuel. Such engines are said to run "lean" or on a "lean mixture." However, this increase in fuel economy is offset by undesired pollution emissions, specifically in the form of oxides of nitrogen (NOx).

One method used to reduce NOx emissions from lean burn internal combustion engines is known as selective catalytic reduction (SCR). SCR, when used, for example, to reduce NOx emissions from a diesel engine, involves injecting an atomized reagent into the exhaust stream of the engine in relation to one or more selected engine operational parameters, such as exhaust gas temperature, engine rpm or engine load as measured by engine fuel flow, turbo boost pressure or exhaust NOx mass flow. The reagent/exhaust gas mixture is passed through a reactor containing a catalyst, such as, for example, activated carbon, or metals, such as platinum, vanadium or tungsten, which are capable of reducing the NOx concentration in the presence of the reagent.

An aqueous urea solution is known to be an effective reagent in SCR systems for diesel engines. However, use of such an aqueous urea solution and other reagents may include disadvantages. Urea is highly corrosive and attacks mechanical components of the SCR system, such as the injectors used to inject the urea mixture into the exhaust gas stream. Urea also tends to solidify upon prolonged exposure to high temperatures, such as encountered in diesel exhaust systems. Solidified urea may accumulate in the narrow passageways and exit orifice openings typically found in injectors. Solidified urea may foul moving parts of the injector and clog any openings, rendering the injector unusable. Solidified urea may also cause backpressure and emission reduction issues with a system. This concern exists because the reagent creates a deposit instead of reducing the NOx.

Several current injector systems include mounting arrangements that position the injector a predetermined distance away from the exhaust pipe. Some injector mounting arrangements may be referred to as a "dog house" or "stand-off" style. This mounting arrangement may introduce re-circulating vortices and cold spots at or near the injector mounting site and the reagent exit orifice. During urea injection, the re-circulating vortices and reduced temperature in the mount area may lead to reagent deposition that may clog the mount area and protrude into the exhaust gas stream.

In addition, if the reagent mixture is not finely atomized, reagent deposits may form in the catalytic reactor, inhibiting the action of the catalyst and thereby reducing the SCR system effectiveness. High injection pressures are one way of minimizing the problem of insufficient atomization of the urea mixture. However, high injection pressures often result in over-penetration of the injector spray plume into the exhaust stream, causing the plume to impinge on the inner surface of the exhaust pipe opposite the injector. Over-penetration leads to inefficient use of the urea mixture and reduces the range over which the vehicle can operate with reduced NOx emissions. Only a finite amount of reagent can be carried on a vehicle, and what is carried should be used efficiently to maximize vehicle range and reduce the need for replenishing the reagent.

Further, reagents may be poor lubricants. This characteristic adversely affects moving parts within the injector and requires that special fits, clearances and tolerances be employed between relatively moving parts within an injector. Some reagents have a high propensity for leakage. This characteristic adversely affects mating surfaces requiring enhanced sealing resources in many locations.

It may be advantageous to provide methods and apparatus for injecting a reagent into the exhaust stream of a lean burn engine to minimize reagent deposition and to prolong the life of the injector components.

The methods and apparatus of the present disclosure provide the foregoing and other advantages.

SUMMARY

This section provides a general summary of the disclosure, and is not a comprehensive disclosure of its full scope or all of its features.

An exhaust gas treatment system for reducing emissions from an engine includes an exhaust conduit adapted to supply an exhaust stream from an engine to an exhaust treatment device. An injector injects a reagent through an aperture in the conduit into the exhaust stream. A vortex breaker includes a mount having a cylindrical sleeve extending through the aperture as well as a flared tube fixed to and positioned within the cylindrical sleeve. A window extends through an upstream portion of the cylindrical sleeve exposing the flared tube to the exhaust stream. The sleeve includes a downstream aperture in fluid communication with the window.

An exhaust gas stream vortex breaker is provided for an exhaust gas treatment system. The exhaust gas treatment system includes an exhaust conduit supplying an exhaust stream from an engine to an exhaust treatment device and an injector for injecting a reagent into the exhaust stream. The vortex breaker comprises a mount adapted to fix the injector to the conduit. The mount includes a cylindrical sleeve adapted to be positioned within the exhaust stream and a flange. A tube has a flared end fixed to the sleeve and a free end spaced apart from the sleeve. A window extends through an upstream portion of the cylindrical sleeve exposing the flared end to the exhaust stream. The sleeve further includes a downstream aperture. A first passageway is in receipt of the exhaust stream and extends between the window and the downstream aperture. A second passageway is in receipt of the exhaust stream and extends from the window, across an outer surface of the tube, around the free tube, and through the tube to the flared end.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

It should be understood that although the present teachings may be described in connection with diesel engines and the reduction of NOx emissions, the present teachings can be used in connection with any one of a number of exhaust streams, such as, by way of non-limiting example, those from diesel, gasoline, turbine, fuel cell, jet or any other power source outputting a discharge stream. Moreover, the present teachings may be used in connection with the reduction of any one of a number of undesired emissions. For example, injection of hydrocarbons for the regeneration of diesel particulate filters is also within the scope of the present disclosure. For additional description, attention should be directed to commonly-assigned U.S. Patent Application Publication No. 2009/0179087A1, filed Nov. 21, 2008, entitled "Method And Apparatus For Injecting Atomized Fluids", which is incorporated herein by reference.

Figure 1:
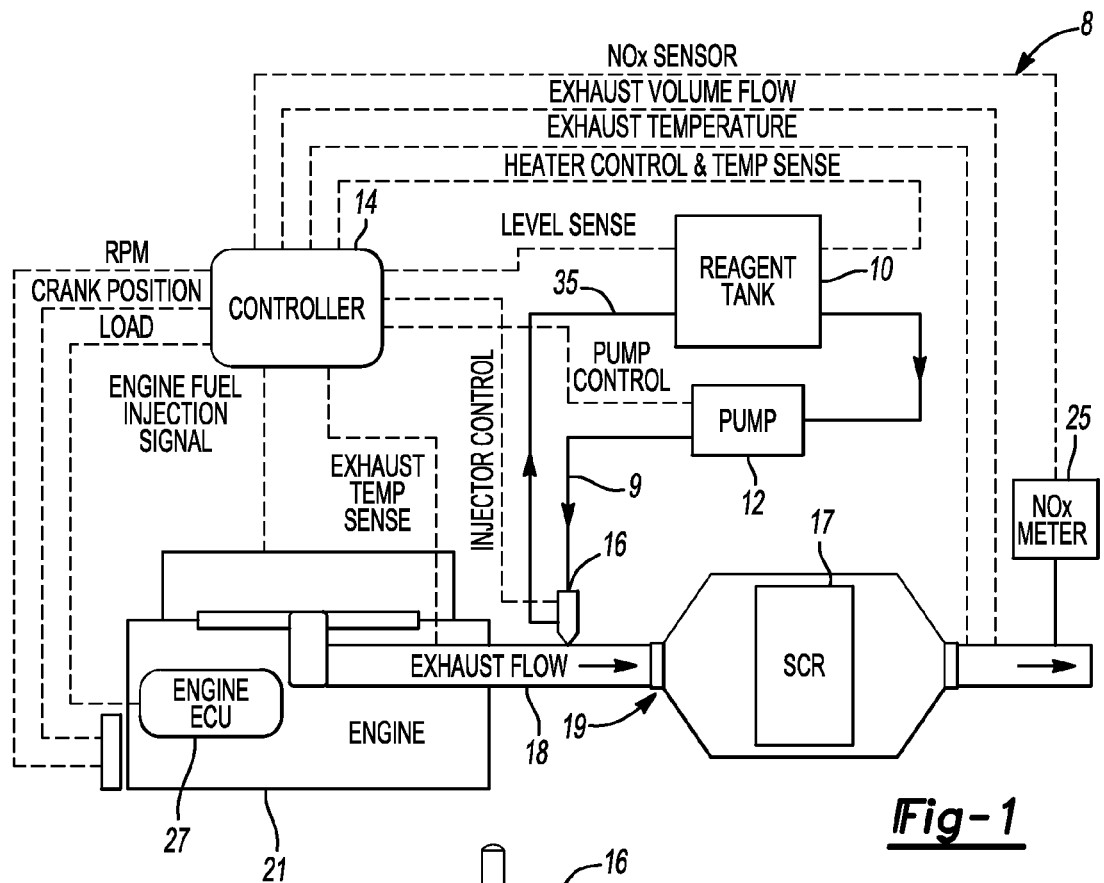
FIG. 1 shows a schematic diagram of an exemplary internal combustion engine with an emissions control system using an injector arrangement according to the present teachings.
Figure 2:
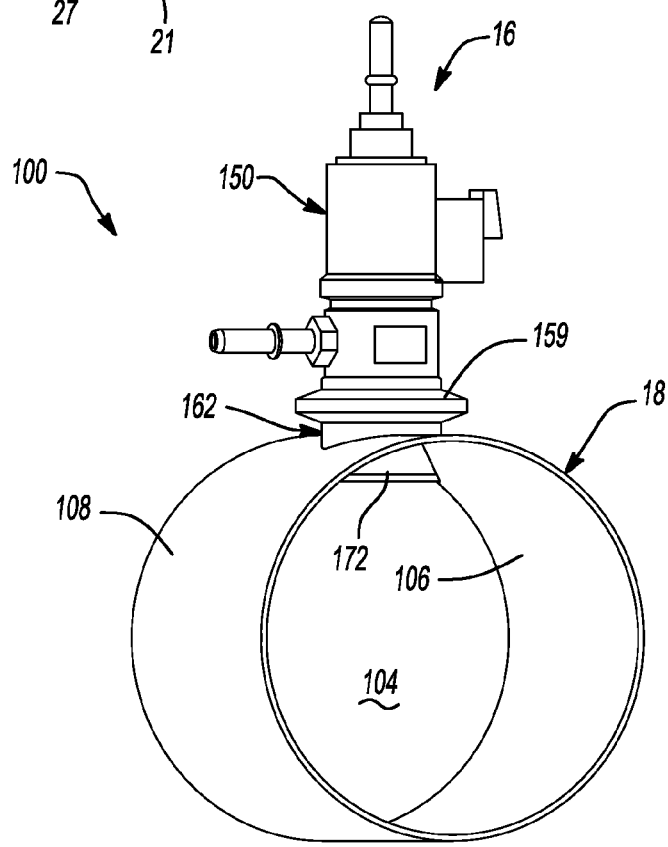
FIG. 2 is a perspective view of an exhaust gas treatment device.

With reference to the Figures, a pollution control system 8 for reducing NOx emissions from the exhaust of a diesel engine 21 is provided. In FIG. 1, solid lines between the elements of the system denote fluid lines for reagent and dashed lines denote electrical connections. The system of the present teachings may include a reagent tank 10 for holding the reagent and a delivery module 12 for delivering the reagent from the tank 10. The reagent may be a urea solution, a hydrocarbon, an alkyl ester, alcohol, an organic compound, water, or the like and can be a blend or combination thereof. It should also be appreciated that one or more reagents can be available in the system and can be used singly or in combination. The tank 10 and delivery module 12 may form an integrated reagent tank/delivery module. Also provided as part of system 8 is an electronic injection controller 14, a reagent injector 16, and an exhaust system 19. Exhaust system 19 includes an exhaust conduit 18 providing an exhaust stream to at least one catalyst bed 17.

The delivery module 12 may comprise a pump that supplies reagent from the tank 10 via a supply line 9. The reagent tank 10 may be polypropylene, epoxy coated carbon steel, PVC, or stainless steel and sized according to the application (e.g., vehicle size, intended use of the vehicle, and the like). A pressure regulator (not shown) may be provided to maintain the system at predetermined pressure setpoint (e.g., relatively low pressures of approximately 60-80 psi, or in some embodiments a pressure of approximately 60-150 psi) and may be located in the return line 35 from the reagent injector 16. A pressure sensor may be provided in the supply line 9 leading to the reagent injector 16. The system may also incorporate various freeze protection strategies to thaw frozen reagent or to prevent the reagent from freezing. During system operation, regardless of whether or not the injector is releasing reagent into the exhaust gases, reagent may be circulated continuously between the tank 10 and the reagent injector 16 to cool the injector and minimize the dwell time of the reagent in the injector so that the reagent remains cool. Continuous reagent circulation may be necessary for temperature-sensitive reagents, such as aqueous urea, which tend to solidify upon exposure to elevated temperatures of 300° C. to 650° C. as would be experienced in an engine exhaust system.

Furthermore, it may be desirable to keep the reagent mixture below 140° C. and preferably in a lower operating range between 5° C. and 95° C. to ensure that solidification of the reagent is prevented. Solidified reagent, if allowed to form, may foul the moving parts and openings of the injector.

The amount of reagent required may vary with load, engine RPM, engine speed, exhaust gas temperature, exhaust gas flow, engine fuel injection timing, desired NOx reduction, barometric pressure, relative humidity, EGR rate and engine coolant temperature. A NOx sensor or meter 25 is positioned downstream from catalyst bed 17. NOx sensor 25 is operable to output a signal indicative of the exhaust NOx content to an engine control unit 27. All or some of the engine operating parameters may be supplied from engine control unit 27 via the engine/vehicle databus to the reagent electronic injection controller 14. The reagent electronic injection controller 14 could also be included as part of the engine control unit 27. Exhaust gas temperature, exhaust gas flow and exhaust back pressure and other vehicle operating parameters may be measured by respective sensors.

Referring now to FIGS. 2-8, an exhaust gas treatment assembly 100 is defined to include exhaust conduit 18 and injector 16. Exhaust conduit 18 includes a substantially cylindrical tube 102 defining an exhaust passageway 104. Cylindrical tube 102 includes an inner surface 106 and an outer surface 108.

Injector 16 includes a body 150 defining a cylindrical chamber 152 in receipt of an axially translatable valve member 154. Body 150 includes an exit orifice 156 as a discharge location for injected reagent. A valve seat 146 is formed proximate exit orifice 156 that is selectively engaged by valve member 154 to control reagent injection into the exhaust gas flow path. Valve member 154 is translatable along an axis of reagent injection 158.

An adapter 159 is fixed to body 150 and includes a radially outwardly extending flange 160. A vortex breaker 162 may be sandwiched between flange 160 and outer surface 108. A clamp (not shown) or some other suitable coupling device fixes flange 160 and vortex breaker 162 to tube 102.

Vortex breaker 162 includes a mount 170 fixed to a flared tube 172. Mount 170 includes a substantially cylindrically-shaped hollow body 174 fixed to a flange 176. A bore 178 extends through flange 176 as well as body 174 and is defined by an inner substantially cylindrically-shaped surface 180. Body 174 also includes an outer cylindrically-shaped surface 182.

A window 184 is positioned at the end of body 174 opposite flange 176. Window 184 is defined by a first axially extending face 186 as well as a second axially extending face 188. A circumferentially extending end face 190 interconnects first axially extending face 186 with second axially extending face 188. Circumferential end face 190 is offset from a terminal end face 192 of body 174. It is contemplated that end face 190 is a curved surface that extends generally parallel to end face 192. More particularly, end face 190 is slightly arched where a height 196 of window 184 at a circumferential midpoint between first axially extending face 186 and second axially extending face 188 is at a maximum.

Flared tube 172 is preferably constructed as a thin walled metallic member having an outer surface 200 and an inner surface 202. Surfaces 200, 202 may be shaped as flared surfaces having a parabolic, conical or some other geometrical form. Flared tube 172 includes a first or free end 204 and a second end 206. Flared tube 172 is positioned within bore 178 such that end 206 of flared tube 172 axially protrudes a minimal amount beyond end face 192. At second end 206, outer surface 200 flares radially outwardly to define a maximum diameter slightly greater than bore 178. As such, when flared tube 172 is inserted within bore 178, an inner edge of end face 192 engages surface 200 of flared tube 172. Flared tube 172 is fixed to mount 170 at this location via a suitable process such as welding. The remainder of flared tube 172 including free end 204 is spaced apart from mount 170.

Once flared tube 172 is fixed to mount 170, a portion of body 174 and flared tube 172 is removed. Cutting or grinding processes may efficiently remove a portion of body 174 and a portion of flared tube 172 to define an aperture 210. Due to the tapered shape of surface 200 and cylindrical shape of bore 178, a venting passageway 212 is formed. Venting passageway 212 extends from window 184, along outer surface 200 and continues to aperture 210.

Figure 3:
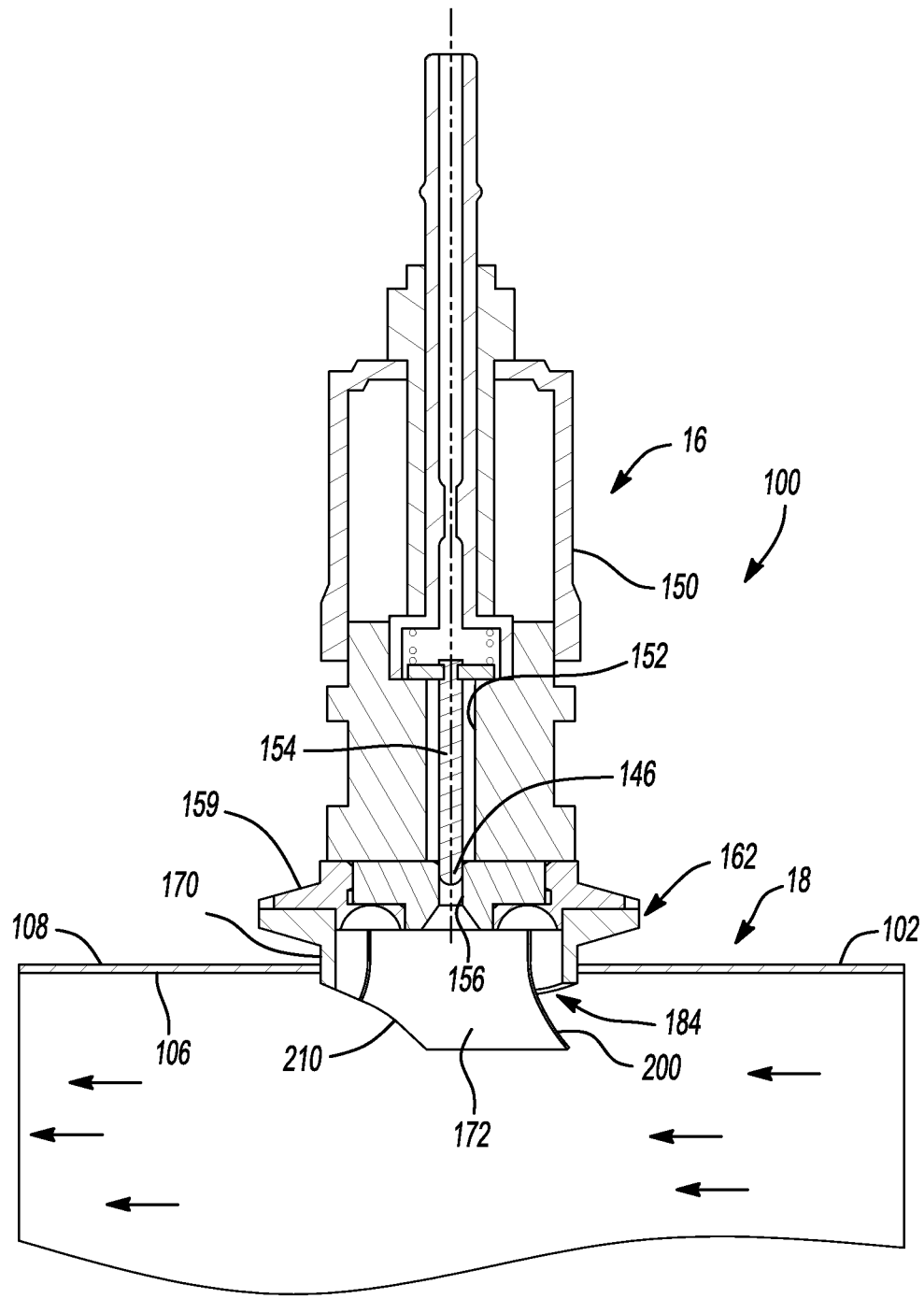
FIG. 3 is a cross-sectional view of the device shown in FIG. 2.
Figure 4:
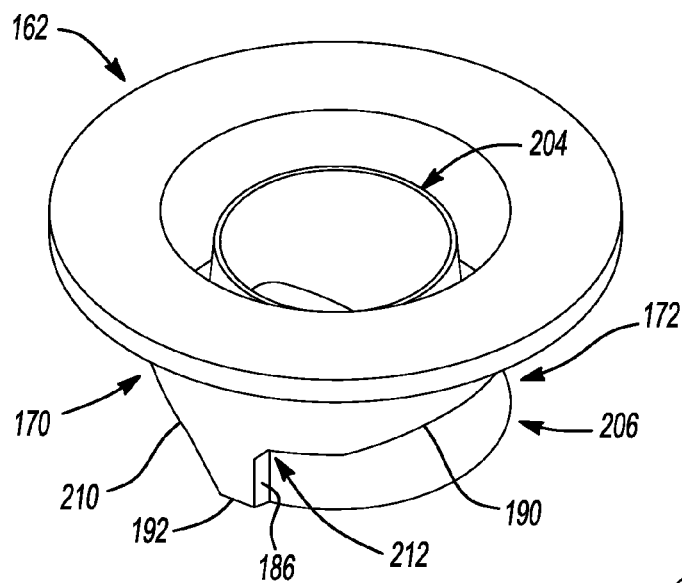
FIG. 4 is a perspective view of an exhaust vortex breaker portion of the exhaust gas treatment device.
Figure 5:
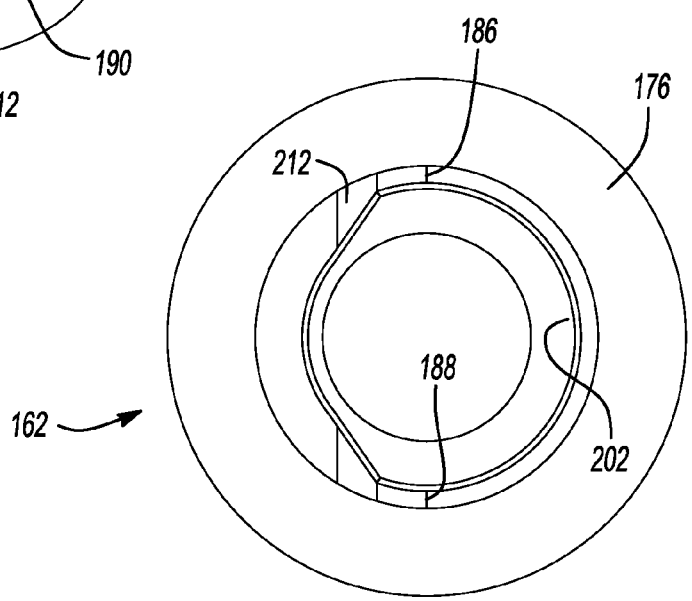
FIG. 5 is a top view of the exhaust vortex breaker portion of the exhaust gas treatment device.
Figure 6:
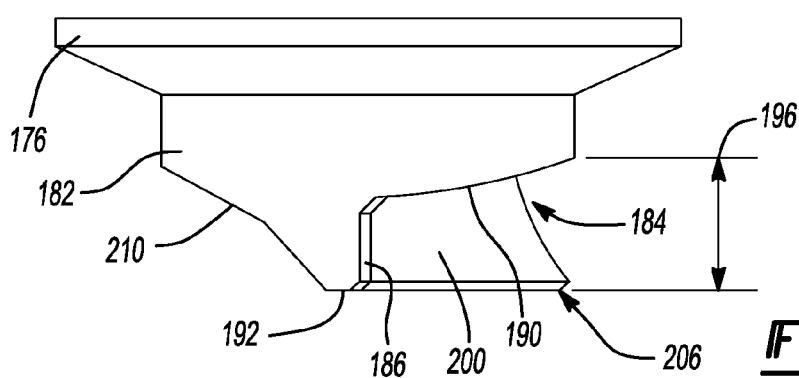
FIG. 6 is a side view of the exhaust vortex breaker portion of the exhaust gas treatment device.
Figure 7:
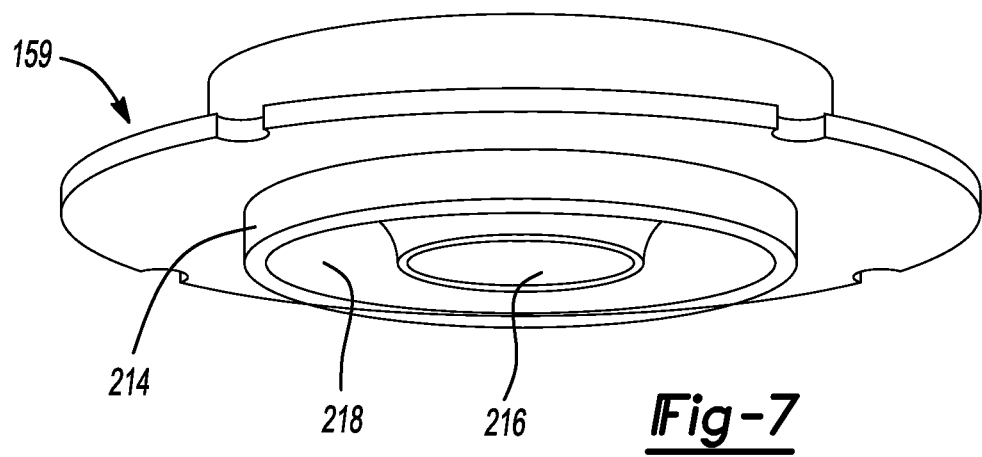
FIG. 7 is a perspective view of an adapter of the exhaust gas treatment device.

As shown in FIG. 3, vortex breaker 162 is oriented to position window 184 at an upstream location and aperture 210 at a downstream location within the exhaust stream flowing through exhaust conduit 18. Window 184 exposes a portion of flared tube 172 to the exhaust stream based upon the upstream location of window 184. Because flared tube 172 is spaced apart from cylindrical tube 102 for the majority of its length, window 184 and outer surface 200 act as a scoop to direct a portion of the exhaust stream into vortex breaker 162. Some of the exhaust stream travels along venting passageway 212 (FIGS. 4 and 5). Another portion of the exhaust stream follows a second passageway identified at reference numeral 213 (FIG. 9).

Figure 8:
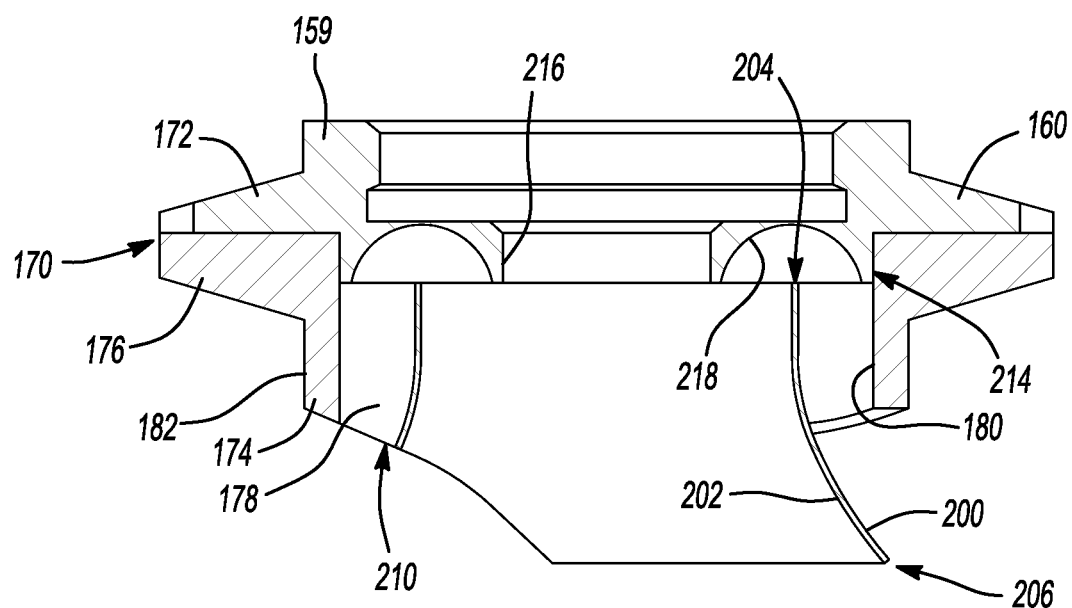
FIG. 8 is a cross-sectional view of the vortex breaker and adapter.

As best shown in FIG. 8, adapter 159 includes a boss 214 axially extending from flange 160 into bore 178. A bore 216 extends through boss 214 to allow injected reagent to flow into exhaust passageway 104. A semi-toroidal surface 218 is formed on a bottom of boss 214 and spaced apart from free end 204 to define a portion of passageway 213. Passageway 213 extends from window 184, along outer surface 200, around first end 204, across inner surface 202, and continues to second end 206. Passageway 213 extends along the entire circumference of first end 204.

During operation of engine 21, combustion produces an exhaust flow through exhaust conduit 18. When electronic controller 14 determines that a reagent injection should occur, axially moveable valve member 154 is displaced to allow pressurized urea to spray from exit orifice 156 through bore 216 and flared tube 172 into the exhaust flow path.

Figure 9:
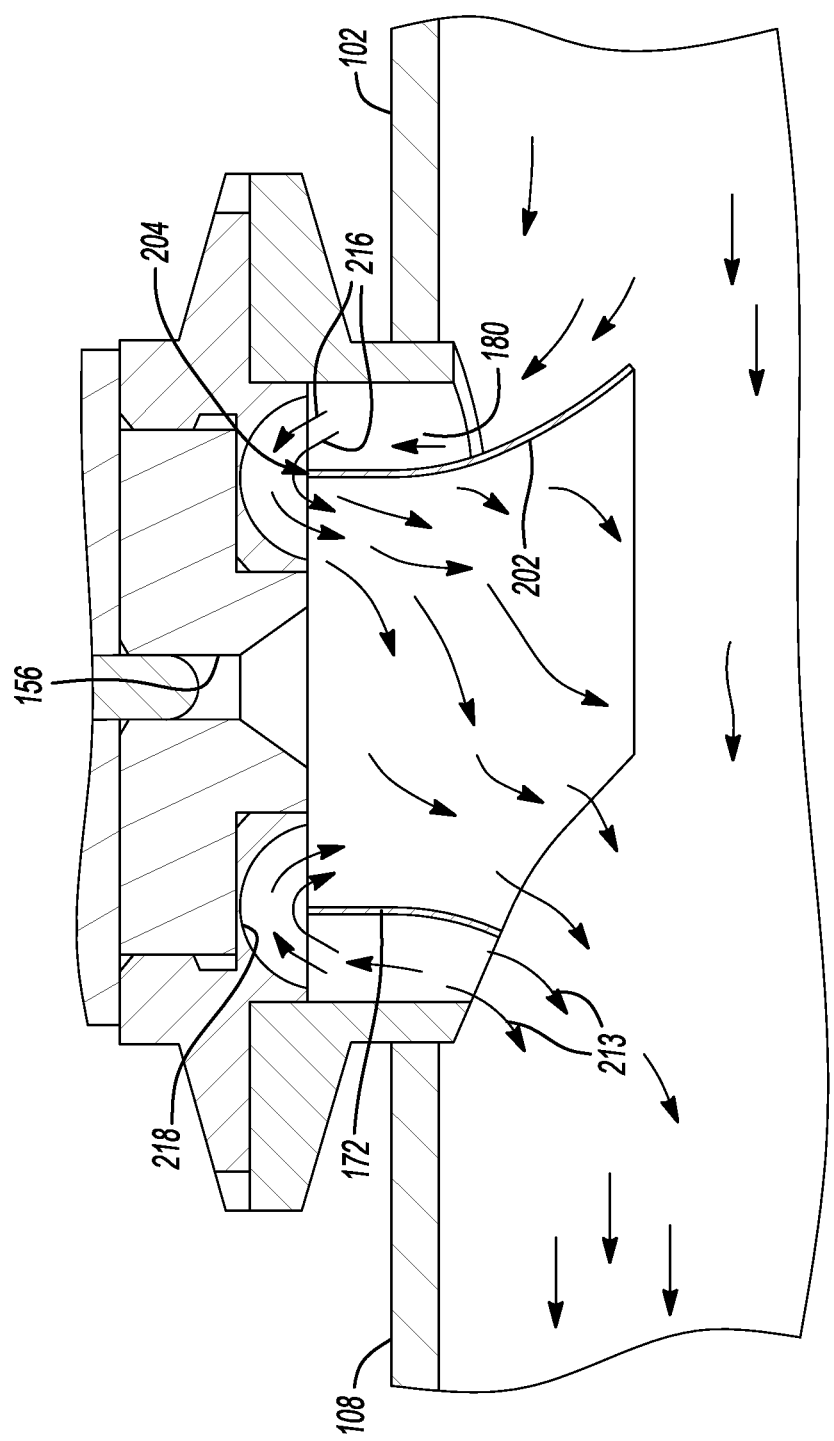
FIG. 9 is a velocity distribution model of an exhaust flow through the vortex breaker.

FIG. 9 depicts a velocity distribution of the exhaust stream and injected reagent associated with the use of vortex breaker 162. Based on the velocity distribution depicted in the Figure, it should be appreciated that reagent provided by injector 16 is sprayed through adapter 159 and mount 170 to become entrained in the exhaust stream flowing downwardly through flared tube 172. Based on the geometry of vortex breaker 162, a thorough mixing of reagent and exhaust gas occurs to minimize the deposition of reagent at or near mount 170 and exit orifice 156.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust gas treatment system for reducing emissions from an engine, the system comprising:
    an exhaust treatment device;
    an exhaust conduit adapted to supply an exhaust stream from the engine to the exhaust treatment device, the conduit including an aperture;
    an injector for injecting a reagent through the aperture and into the exhaust stream; and
    a vortex breaker including a mount having a cylindrical sleeve extending through the aperture as well as a flared tube positioned within and fixed to a distal end of the cylindrical sleeve, the flared tube including a free end spaced apart from the sleeve over which a portion of the exhaust stream flows, wherein a window extends through an upstream portion of the cylindrical sleeve exposing the flared tube to the exhaust stream, the sleeve including a downstream aperture in fluid communication with the window.

2. The exhaust gas treatment system of claim 1 wherein the injector is operable to inject a reagent through the sleeve and the flared tube.

3. The exhaust gas treatment system of claim 1 wherein the free end of the flared tube includes a substantially circular cylindrical shape.

4. The exhaust gas treatment system of claim 3 wherein a flared end of the flared tube is positioned opposite the free end and includes the largest outer diameter portion of the tube.

5. The exhaust gas treatment system of claim 4 wherein the outer diameter of the flared end is greater than an inner diameter of the sleeve.

6. The exhaust gas treatment system of claim 1 wherein the window and the exposed portion of the flared tube function as a scoop directing the exhaust stream along first and second passageways.

7. The exhaust gas treatment system of claim 6 wherein the first passageway extends from the window, along an outer surface of the flared tube, and to the downstream aperture.

8. The exhaust gas treatment system of claim 7 wherein the second passageway extends from the window, across an outer surface of the tube, around the free end of the tube, and through the tube to the flared end of the tube.

9. The exhaust gas treatment system of claim 1, wherein the vortex breaker varies the exhaust stream to disperse reagent into the exhaust stream and minimize reagent deposits proximate the mount.

10. An exhaust gas stream vortex breaker for an exhaust gas treatment system including an exhaust conduit and an injector for injecting a reagent into an exhaust stream, the vortex breaker comprising:
    a mount adapted to fix the injector to the conduit, the mount including a cylindrical sleeve adapted to be positioned within the exhaust stream and a flange;

a tube positioned within the cylindrical sleeve, having a flared end fixed to the sleeve, and having a free end spaced apart from the sleeve, wherein a window extends through an upstream portion of the cylindrical sleeve exposing the flared end to the exhaust stream, the sleeve further including a downstream aperture;

a first passageway in receipt of the exhaust stream, the first passageway extending between the window and the downstream aperture; and a second passageway in receipt of the exhaust stream, the second passageway extending from the window, across an outer surface of the tube, around the free end of the tube, and through the tube to the flared end.

11. The exhaust gas stream vortex breaker of claim 10 wherein the flange is adapted to be fixed to the conduit.

12. The exhaust gas stream vortex breaker of claim 10 wherein the free end of the flared tube includes a substantially circular cylindrical shape.

13. The exhaust gas stream vortex breaker of claim 12 wherein a flared end of the tube includes the largest outer diameter portion of the tube.

14. The exhaust gas stream vortex breaker of claim 13 wherein the outer diameter of the flared end is greater than an inner diameter of the sleeve.

15. The exhaust gas stream vortex breaker of claim 10 wherein the window and the exposed portion of the flared tube function as a scoop directing the exhaust stream along the first and second passageways.

16. The exhaust gas stream vortex breaker of claim 10 wherein the second passageway includes the entire circumference of the free end of tube.

17. The exhaust gas stream vortex breaker of claim 10 wherein the first and second passageways are in communication with each other.

18. The exhaust gas stream vortex breaker of claim 10 wherein the second passageway includes a torus-shaped surface spaced apart from and coaxially aligned with the free end of the tube.

* * * * *

UNITED STATES PATENT AND TRADEMARK OFFICE
CERTIFICATE OF CORRECTION

| | |
|---|---|
| PATENT NO. | : 8,438,839 B2 |
| APPLICATION NO. | : 12/907421 |
| DATED | : May 14, 2013 |
| INVENTOR(S) | : Floyd et al. |

It is certified that error appears in the above-identified patent and that said Letters Patent is hereby corrected as shown below:

On the Title page, Item (75) Listing of Inventors:

Larry J. Greer should be replaced with Larry J. Geer

Signed and Sealed this
Sixth Day of August, 2013

Teresa Stanek Rea
*Acting Director of the United States Patent and Trademark Office*